(No Model.)
T. W. ALLAN.
ELECTRIC STORAGE BATTERY.
No. 571,059. Patented Nov. 10, 1896.
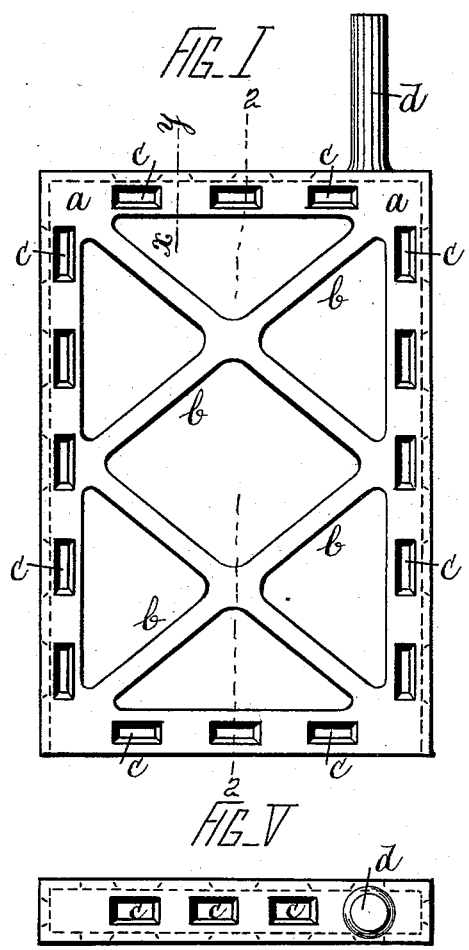
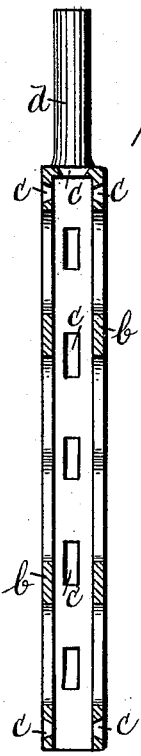
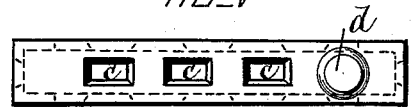
Witnesses:
Otto Munk
E. A. Scott
Inventor:
Thomas William Allan
by Richardson
Atty

UNITED STATES PATENT OFFICE.

THOMAS WILLIAM ALLAN, OF LONDON, ENGLAND.

ELECTRIC STORAGE BATTERY.

SPECIFICATION forming part of Letters Patent No. 571,059, dated November 10, 1896.

Application filed February 19, 1896. Serial No. 579,927. (No model.) Patented in England November 20, 1895, No. 22,120.

*To all whom it may concern:*

Be it known that I, THOMAS WILLIAM ALLAN, a subject of the Queen of Great Britain, residing at Kennington, London, in the county of Surrey, England, have invented a new and useful Improvement in Electric Storage Batteries, (for which I have obtained a patent in Great Britain, numbered 22,120 and bearing date November 20, 1895,) of which the following is a specification.

My invention relates to the special features of construction in my accumulator-plate, as will be hereinafter particularly described.

Figure 1 is a front view; Fig. 2, a vertical transverse section on line 2 2 of Fig. 1; Fig. 3, a side view; and Fig. 4, a separate section through the edge of the plate on the line $x\,y$, Fig. 1. Fig. 5 is a view from above.

Similar letters refer to similar parts throughout the several views.

The plate or cell is cast in one piece in lead or other suitable metal or alloy, such, for instance, as antimoniated lead; and it consists of an outer frame or edge recessed on the inside, as shown in Fig. 4, of rectangular or other suitable shape and of the desired width, the side flanges being connected together by plates or stays $b\,b$, cast with the edge, so as to form openings in the sides, which may be of any desired number, and more or less rectangular, as shown, or of any other convenient shape.

The sides of the outer frame, as well as its outer edge, have openings $c\,c$ through them so arranged in position that they may be as many in number or including as much area as is conveniently possible without too much affecting the strength and rigidity of the frame, and these openings are made beveled at their edges, as shown, so that they are of larger area at their outer than at their inner surface. The active material or filling is pressed in the usual way into the metal cell, formed as described and shown.

The lower edge of the cell is shown open for the convenience of easily withdrawing the core upon which the plates are cast, the beveled edges of the openings $c\,c$ also facilitating the fitting together and withdrawal of the parts of the metallic mold in which the improved cell is cast. This lower open edge may afterward be closed, if desired. The projection $d$ is to be used to form a connection for conducting-wire. The corners of the plates, at $a$, are left, as shown, without openings through them, great strength and rigidity being thus obtained.

I am aware that prior to my invention plates for electric storage batteries have been made having projections or openings through them in which the filling material is placed. I do not claim such a construction broadly; but

What I claim as my invention, and desire to secure by Letters Patent, is—

An accumulator-plate comprising the rectangular frame having the integral inwardly-extending flanges, and a set of stays upon each face of the frame connecting the edges of the flanges, said frame having beveled edged perforations in three of its edges and in the flanges and having one edge left open for the removal of the core in casting, substantially as described.

In testimony whereof I have hereunto set my hand in the presence of two witnesses.

THOMAS WILLIAM ALLAN.

Witnesses:
ARTHUR E. EDWARDS,
W. E. SYKES.